United States Patent
Veeraraghavan et al.

(10) Patent No.: US 10,430,341 B2
(45) Date of Patent: Oct. 1, 2019

(54) LOG-STRUCTURED STORAGE METHOD AND SERVER

(71) Applicant: Huawei Technologies Co., Ltd., Shenzhen (CN)

(72) Inventors: Vinoth Veeraraghavan, Shenzhen (CN); Zhibiao Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/692,818

(22) Filed: Aug. 31, 2017

(65) Prior Publication Data

US 2018/0137055 A1 May 17, 2018

Related U.S. Application Data

(63) Continuation of application No. PCT/CN2016/106103, filed on Nov. 16, 2016.

(51) Int. Cl.
| | | |
|---|---|---|
| *G06F 12/08* | (2016.01) | |
| *G06F 12/0864* | (2016.01) | |
| *G06F 16/901* | (2019.01) | |
| *G06F 16/10* | (2019.01) | |
| *G06F 16/18* | (2019.01) | |

(52) U.S. Cl.
CPC .......... *G06F 12/0864* (2013.01); *G06F 16/10* (2019.01); *G06F 16/9014* (2019.01); *G06F 16/1805* (2019.01)

(58) Field of Classification Search
CPC ........... G06F 12/0864; G06F 17/30949; G06F 16/9014; G06F 16/10; G06F 16/1805
USPC ........................................................ 711/128
See application file for complete search history.

(56) References Cited

U.S. PATENT DOCUMENTS

| | | | |
|---|---|---|---|
| 10,013,440 B1 * | 7/2018 | Gupta | ............... G06F 17/30312 |
| 2014/0379991 A1 | 12/2014 | Lomet et al. | |

FOREIGN PATENT DOCUMENTS

| | | |
|---|---|---|
| CN | 102981933 A | 3/2013 |
| CN | 105243067 A | 1/2016 |
| WO | 2009158084 A2 | 12/2009 |

OTHER PUBLICATIONS

Machine Translation and Abstract of Chinese Publication No. CN102981933, Mar. 20, 2013, 18 pages.
Machine Translation and Abstract of Chinese Publication No. CN105243067, Jan. 13, 2016, 15 pages.
Rumble, S., et al., "Log-structured Memory for DRAM-based Storage" 12th USENIX Conference on File and Storage Technologies, Feb. 17-20, 2014, 17 pages.
(Continued)

*Primary Examiner* — Hua J Song
(74) *Attorney, Agent, or Firm* — Conley Rose, P.C.

(57) ABSTRACT

A log-structured storage method and a server, where the method includes obtaining a current incremental update of an object when the object is updated, wherein a current version of the object is stored in a log-structured storage area of the server, determining whether there is a previous incremental update of the object stored in the log-structured storage area, writing the current incremental update as a latest incremental update in the log-structured storage area when there is no previous incremental update of the object stored in the log-structured storage area such that the utilization of memory can be improved.

10 Claims, 5 Drawing Sheets

(56) References Cited

OTHER PUBLICATIONS

Foreign Communication From a Counterpart Application, PCT Application No. PCT/CN2016/106103, English Translation of International Search Report dated Jul. 28, 2017, 7 pages.
Foreign Communication From a Counterpart Application, PCT Application No. PCT/CN2016/106103, English Translation of Written Opinion dated Jul. 28, 2017, 4 pages.

* cited by examiner

LOG-STRUCTURED STORAGE METHOD AND SERVER

CROSS-REFERENCE TO RELATED APPLICATION

This application is a continuation of International Patent Application No. PCT/CN2016/106103 filed on Nov. 16, 2016, which is hereby incorporated by reference in its entirety.

TECHNICAL FIELD

The embodiments of the present application relate to information storage technologies, and particularly, to a log-structured storage method and a server.

BACKGROUND

In recent years, a new class of storage systems has arisen in which all data is stored in a Dynamic Random-Access Memory (DRAM). Because of the relatively high cost of DRAM, it is important for these systems to use their memory efficiently.

In order to improve usage efficiency of memory, a log-structured approach which treats memory as a sequentially written log is proposed. The approach supports memory utilizations of 80-90% while providing high performance, provides incremental copying garbage collectors, supports concurrent cleaning without affecting normal operations, and handles changing workloads.

However, the restriction of the approach is that it supports only APPEND operation. Thus, each time that an object is updated, a new full version of the object is appended to the log and the old one is marked as deprecated. Periodically, a log cleaner recovers all the wasted space. While this approach is very efficient when the ratio of reads is very high or the size of the objects is small (for example, a few bytes), in the case of update of a large object (for, example, several kilobytes (KB)), the log grows continuously with new versions of the object even though only a few bytes of the object have changed, therefore occupying amount of storage space.

Therefore, it is needed to provide a solution to improve utilization of memory.

SUMMARY

The present application provides a log-structured storage method and a server, which can improve utilization of memory.

In a first aspect, the present application provides a log-structured storage method implemented by a server. The server obtains a current incremental update of an object when the object is updated, wherein a current version of the object is stored in a log-structured storage area of the server. The server determines whether there is a previous incremental update of the object stored in the log-structured storage area. The server writes the current incremental update as a latest incremental update in the log-structured storage area when there is no previous incremental update of the object stored in the log-structured storage area. The current incremental update may be a difference between the current version of the object and the previous version of the object or a current change or modification of the object.

By obtaining a current incremental update of an object and writing the incremental update in the log-structured storage area instead of writing the full current version of the object in the log-structured storage area, the utilization of memory can be improved, since the incremental update is just a part of the full current version of the object.

According to a first implementation of the method of the first aspect, the server merges the previous incremental update with the current incremental update to obtain a latest incremental update when there is the previous incremental update of the object stored in the log-structured storage area, and writes the latest incremental update in the log-structured storage area. By merging a current incremental update of an object with a previous incremental update of the object which has been stored in the log-structured storage area to obtain a latest incremental update and writing the latest incremental update in the log-structured storage area instead of writing the full current version of the object in the log-structured storage area, the utilization of memory can be further improved since the latest incremental update is just a part of the full current version of the object.

According to a second implementation of the method according to the first implementation, the server further reads the previous incremental update from the log-structured storage area before merging the previous incremental update with the current incremental update to obtain a latest incremental update, and the server further marks the previous incremental update as deprecated after writing the latest incremental update in the log-structured storage area. Since the previous incremental update is marked as deprecated when the latest incremental update is written, at any point of time, there will be at most one valid incremental update for the object in the log-structured storage area. In addition, the marked previous incremental update may be cleaned in a background cleaning process to further improve the utilization of memory.

According to a third implementation of the method according to the second implementation, the current version of the object is stored in the log-structured storage area through a hash table in which a hash entry comprises an object reference for the current version of the object. The server finds the hash entry in the hash table using a primary key for the current versions of the object, determines whether there is an incremental update reference for the previous incremental update in the hash entry, and reads the previous incremental update from the log-structured storage area according to the incremental update reference when there is the incremental update reference for the previous incremental update in the hash entry. Since the hash table may provide fast access to the object and the incremental update in the log-structured storage area, it allows the object and the incremental update to be located quickly according to the primary key, and thus the access efficiency of the object is increased.

According to a fourth implementation of the method according to the third implementation, the server further updates the incremental update reference for the latest incremental update in the hash entry after the latest incremental update is written in the log-structured storage area.

According to a fifth implementation of the method according to the third or fourth implementation, the server writes the latest incremental update along with the primary key in the log-structured storage area. With the primary key stored along with the latest incremental update in the log-structured storage area, it is facilitated for the log cleaner to access the hash table entry and hence object itself and the latest incremental update entry stored in the log-structured storage area.

According to a sixth implementation of the method according to the fifth implementation, the server further merges the current version of the object with the latest incremental update to obtain a latest version of the object during a background cleaning process, writes the latest version of the object in the log-structured storage area, marks the current version of the object as deprecated, and updates the object reference for the latest version of the object to a new object reference for the latest version of the object in the hash entry. Since the object and the latest incremental update stored in the log-structured storage area are merged, access efficiency may be increased. In addition, since the marked object may be cleaned in a background cleaning process, the utilization of memory is further increased.

According to a seventh implementation of the method according to the first aspect or any one of the above amended implementations, the server further reads the current version of the object from the log-structured storage area, determines whether there is the latest incremental update in the log-structured storage area, and returns the current version of the object to a client when there is no latest incremental update in the log-structured storage area.

According to an eighth implementation of the method according to the seventh implementation, the server further reads the latest incremental update from the log-structured storage area when there is the latest incremental update in the log-structured storage area, merges the latest incremental update to the latest version of the object, and returns the latest version of the object to a client such that the full current object can be provided with the client.

According to a ninth implementation of the method according to the eighth implementation, the current version of the object is stored in the log-structured storage area through a hash table, during the reading operation, the server first finds a hash entry for the object in the hash table using a primary key for current version of the object, and then reads the current version of the object from the log-structured storage area according to an object reference in the hash entry. The server determines whether there is an incremental update reference for the latest incremental update in the hash entry, and reads the latest incremental update from the log-structured storage area according to the incremental update reference when there is the incremental update reference for the latest incremental update in the hash entry. Since the hash table may provide fast access to object and the incremental update in the log-structured storage area, and it allows the object and the incremental update to be located quickly according to the primary key, and thus the access efficiency of the object is increased.

In a second aspect, the present application provides a server. The server includes units for performing the method of the first aspect.

In a third aspect, the present application provides a server. The server includes a memory unit, a communication interface and a processor coupled with the memory unit and the communication interface. The memory unit is configured to store instructions, the processor is configured to execute the instructions and the communication interface is configured to communicate with a network node under control of the processor. The instructions, when executed by the processor, cause the processor to perform the method of the first aspect.

BRIEF DESCRIPTION OF DRAWINGS

To illustrate the technical solutions in the embodiments of the present application more clearly, a brief introduction on the accompanying drawings which are needed in the description of the embodiments given below. The accompanying drawings in the description below are merely some of the embodiments of the present application, based on which other drawings can be acquired by the persons of ordinary skill in the art without any inventive effort.

DESCRIPTION OF EMBODIMENTS

The technical solutions in the embodiments of the present application will be described clearly hereinafter with reference to the accompanying drawings in the embodiments of the present application. Evidently, the described embodiments are merely part, but not all, of the embodiments of the present application. All other embodiments, which can be derived by persons of ordinary skills in the art based on the embodiments of the present application without any inventive efforts, shall fall into the protection scope of the present application.

A log-structured approach may write new information to a memory in a sequential structure called a log, and the new information is stored at the end of the log. The log-structured approach may be used for update intensive workload scenarios, for example, session database used in scenarios which stores subscriber session data.

The technique involved in the embodiments of the present application may be a DRAM-based storage system based on the log-structured approach, such as, a RAMCloud storage system which implements log-structured memory. The embodiments of the present application are not limited thereto, for example, the storage system according to the embodiments of present application may be any of storage systems using the log-structured approach.

The RAMCloud may be a storage system that stores data in DRAMs of storage servers within a datacenter. Each storage server may contain two components a master module which manages the main memory of the server to store objects, and handles read and write requests from clients, and a backup module which uses local disk or flash memory to store backup copies of data owned by masters on other servers.

Figure 1:
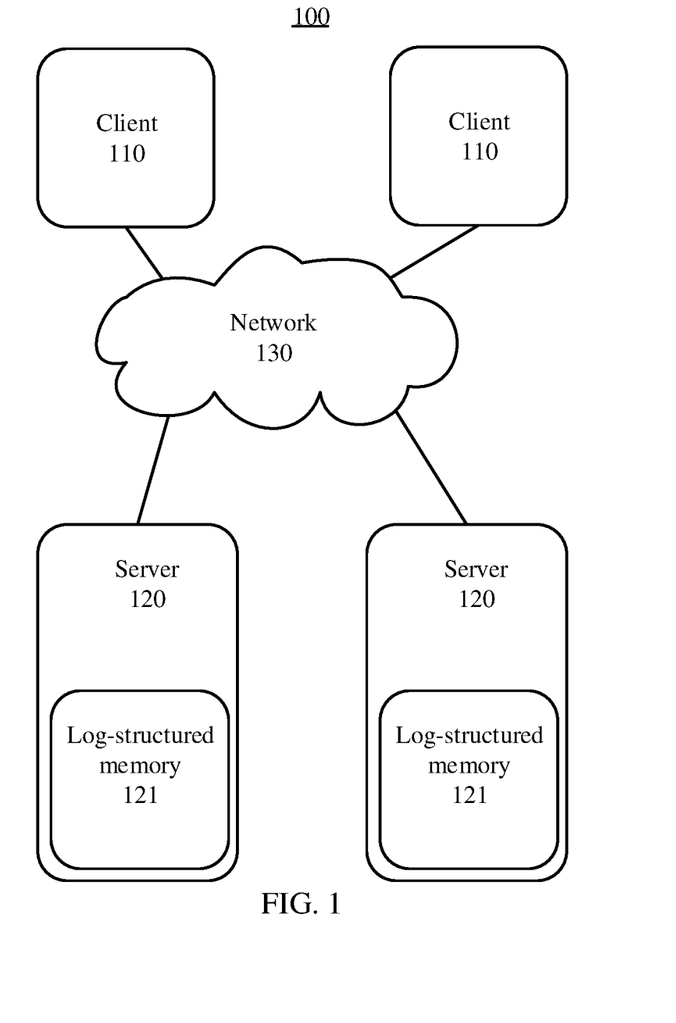
FIG. 1 depicts an architecture diagram of a log-structured storage system according to an embodiment of the present application.

FIG. 1 depicts an architecture diagram of a log-structured storage system 100 according to an embodiment of the present application.

The log-structured storage system 100 includes at least one client 110 and at least one server 120, and the at least one server 120 may communicate with the at least one client 110 via a network 130. The server 120 includes a log-structured memory 121. The client 110 is configured to send a write request for writing an object, an update request for updating the object or a read request for reading the object to the server 120. The server 120 is configured to write or update the object in the long-structured memory 121 according to the writing request or the update object respectively, or read the object from the long-structured memory 121 according to the read request. Each log in the log-structured memory 121 may be divided into multiple segments. For example, the size of one segment may be 8 megabytes (MB).

According to embodiments of the present application, when receiving the write request including the object to be stored in the log-structured memory 121 from the client 110, the server 120 may store the object in the log-structured memory 121 of the server 120, i.e., an original or initial version of the object is stored in the log-structured memory 121. When receiving the update request including a current update of the object, the server 120 may only store the current update in the log-structured memory 121 if there is not a previous update of the object stored in the log-structured memory 121. Otherwise the server 120 may merge the current update with the previous update in the log-structured memory 121. Such an update may be a change, increment, reduction, or modification of the object, or a difference between a current version of the object and a previous version of the object and also called an incremental update or a delta update of the object hereinafter. During the update process, the incremental update of the object instead of an entire or full current or new version of object is appended to the log. The incremental update may be a simple sequence of bytes for explaining current update of the object. It is to be understood that the naming of the update and the object in the embodiments of the present application is for the identification purposes only. It can be noted that, if the object is updated again, an old or previous incremental update may be merged with a current incremental update to obtain a new or latest incremental update and the new or latest incremental update may be appended to the log, while the old or previous incremental update will be deprecated. Therefore, for each object there might be at most one valid incremental update in the log-structured memory 121 of the server 120.

When receiving a read request for reading an object from a client 110, the server 120 may obtain the object and the incremental update of the object from the log-structured memory 121 of the server 120, then apply the incremental update to the object to obtain the latest version of the object, and send the latest version of the object to the client 110.

According to embodiments of the present application, very efficient memory utilization may be achieved as only incremental update is appended and the full object is kept as it is. Without reading the whole object, updates of the object are much faster as the amount bytes written is less, and thus better cache efficient may be achieved. In addition, the amount of data transferred to a replica node will be very less as it is enough to transfer only the incremental update.

Figure 2:
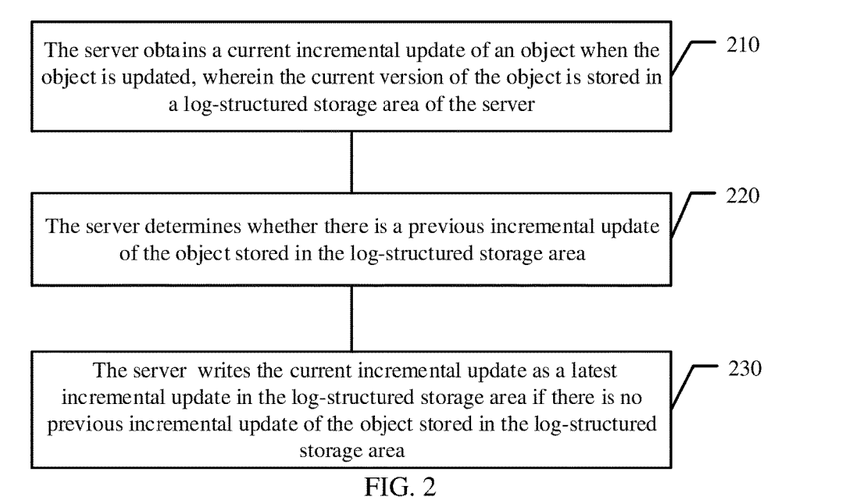
FIG. 2 depicts a schematic flowchart of a log-structured storage method according to an embodiment of the present application.

FIG. 2 depicts a schematic flowchart of a log-structured storage method according to an embodiment of the present application. The log-structured storage method may be implemented by a server in FIG. 1 and may include the following contents.

Step 210: The server obtains a current incremental update of an object when the object is updated, wherein a current version of the object is stored in a log-structured storage area of the server.

The current version of the object may be an original or initial version of the object which is originally stored in the log-structured storage area according to a write request from the client. The current version of the object is also obtained by merging a previous version of the object and a previous incremental update in a background cleaning process and stored in the log-structured storage area. The current incremental update indicates a current change, increment, reduction, or modification made on the object, or a difference between a current version of the object and a previous version of the object. A same identification may be used to identifying the original version of the object, the current version of the object and the previous version of the object. The log-structured storage area may be a memory in the server, for example, the log-structured storage area may be a DRAM, a solid state device (SSD) or other disks. Embodiments of the present application are not limited thereto, for example, the log-structured storage area may also be a disk array such as a redundant arrays of inexpensive disks (RAID).

For example, when the object is updated, a client may send an update request including the current incremental update of the object to the server, and the object may be updated many times. Embodiments of the present application are not limited thereto, for example, if the server is a replica node, the server may also receive the update request from another server.

Step 220: The server determines whether there is a previous incremental update of the object stored in the log-structured storage area.

The object may be updated multiple times, and the previous incremental update indicates a change, increment, reduction, or modification made on the object, or a difference between last two versions of the object when the object is updated previously.

Step 230: The server writes the current incremental update as a latest incremental update in the log-structured storage area if there is no previous incremental update of the object stored in the log-structured storage area.

The object may be updated many times. When the object is updated firstly, there is not previous incremental update of the object is stored in the log-structured storage area. In addition, in a background cleaning process, the previous version of object and the previous incremental update stored in the log-structured storage area might be merged into a latest version of the object, and thus when the object is update again, there is no previous incremental update of the object stored in the log-structured storage area. In these cases, the server may directly store the current update in the log-structured storage area.

For example, when the object is updated, a client may send an update request including the current incremental update of the object to the server. The server may determine whether there is a previous incremental update stored in the log-structured storage area when the server receives the update request. If there is no previous incremental update stored in the log-structured storage area, the server may write the current incremental update in the log-structured storage area so that the combination of the current version of the object which has been stored in the log-structured storage area and the current incremental update which is newly appended to the log can reflect the currently updated version (i.e. the latest version) of the object.

According to embodiments of the present application, by obtaining a current incremental update of an object and writing the incremental update in the log-structured storage area instead of writing the full current version of the object in the log-structured storage area, the utilization of memory can be improved, since the incremental update is just a part of the full current version of the object.

It should be understood that the update process of the object may be an iteration process.

Optionally, as another embodiment, the server merges the previous incremental update with the current incremental update to obtain a latest incremental update if there is the previous incremental update of the object stored in the log-structured storage area, and writes the latest incremental update in the log-structured storage area.

If the current incremental update is not the first update of the object, there might be a previous incremental update that has been stored in the log-structured storage area. For example, the server may read the previous incremental update from the log-structured storage area, and apply the current incremental update to the previous incremental update to obtain the latest incremental update.

By merging a current incremental update of an object with a previous incremental update of the object which has been stored in the log-structured storage area to obtain a latest incremental update and writing the latest incremental update in the log-structured storage area instead of writing the full current version of the object in the log-structured storage area, the utilization of memory can be further improved since the latest incremental update is just a part of the full current version of the object.

Optionally, as another embodiment, before merging the previous incremental update with the current incremental update to obtain a latest incremental update, the server may further read the previous incremental update from the log-structured storage area. In addition, after writing the latest incremental update in the log-structured storage area, the log-structured storage method, the server may further mark the previous incremental update as deprecated.

Further, if the server determines that there is a previous incremental update stored in the log-structured storage area, the server may first read the previous incremental update from the log-structured storage area, merge the current incremental update with the previous incremental update to obtain a latest incremental update, then store the latest incremental update in the log-structured storage area. In addition, the server may mark the previous incremental update in the log-structured storage area as deprecated such that the previous incremental update may be cleaned in a clean process executed in a background cleaning process, thereby saving storage space.

According to embodiments of the present application, the current version of the object may be stored in the log-structured storage area through a hash table in which a hash entry comprises an object reference for the current version of the object. The server may determine whether there is a previous incremental update of the object stored in the log-structured storage area by finding the hash entry in the hash table using a primary key for the current versions of the object, and determining whether there is an incremental update reference for the previous incremental update in the hash entry. The server may read the previous incremental update from the log-structured storage area by reading the previous incremental update from the log-structured storage area according to the incremental update reference if there is the incremental update reference for the previous incremental update in the hash entry.

The server may store the object in the log-structured storage area using the hash table. The hash table may include the hash entry for the object stored in the log-structured storage area. The hash entry may be determined by a primary key and a hash function. When storing the object or latest incremental update in the log-structured storage area, the server may store the object reference for the object and the incremental update reference for the latest incremental update in the hash entry respectively. The hash table may provide fast access to object and incremental update in the log-structured storage area, and it allows the object to be located quickly according to the primary key. For example, the server may find the corresponding hash entry in the hash table according to the primary key and a hash function, and read the object or the precious incremental update according to the object reference or the incremental update reference stored in the hash entry for the object from the log-structured storage area respectively.

According to embodiments of the present application, when the object is updated, the incremental updates of the object along with the primary key may be stored in the log, and the reference to the incremental update may be also stored in the hash table entry along with the reference to the object, without re-writing the whole object again during update operations, thereby further increasing storage efficiency.

Optionally, as another embodiment, the server may further update the incremental update reference for the new incremental update in the hash entry after the new incremental update is written in the log-structured storage area.

According to embodiments of the present application, the server writes the latest incremental update along with the primary key in the log-structured storage area. Since the primary key is also stored with the incremental update, it is facilitated for a log cleaner to access the hash table entry and hence object itself and the incremental update entry stored in the log-structured storage area.

Optionally, as another embodiment, the server may further merge the current version of the object with the latest incremental update to obtain a latest version of the object during a background cleaning process, write the latest version of the object in the log-structured storage area, mark the current version of the object as deprecated, and update the object reference for the latest version of the object to a new object reference for the latest version of the object in the hash entry.

A log cleaner may be used to recycle a free space that accumulates in the log-structured storage area when objects are deleted or overwritten. The log cleaner may scan segments in the log-structured storage area and copy any live objects to new survivor segments. The server may determine the live objects by checking for a reference to the object in the hash table. The live objects may be stored by age to improve the efficiency of cleaning in the future. The log cleaner may run concurrently with normal operations (for example, writing operation and reading operation) and employs multiple threads. For example, the server may use two techniques, two level cleaning and parallel cleaning with multiple threads, and may select several segments to clean. In addition, the log cleaner can merge the incremental update to the object stored in the log-structured storage area during background log cleaning to reduce the impact on reads.

Optionally, as another embodiment, the server may further read the current version of the object from the log-structured storage area, determine whether there is the latest incremental update in the log-structured storage area, and return the current version of the object to a client if there is no latest incremental update in the log-structured storage area.

During read operation, the server first reads the current version of the object stored in the log-structured storage area, and then determines whether there is a latest incremental update stored in the log-structured storage area. If no, the server may directly send the current version of object to the client. Further, when the current version of the object is stored in the log-structured storage area through a hash table, the server may read the current version of the object from the log-structured storage area by finding a hash entry for the current version of the object in the hash table using a primary key for the object and reading the current version of the object from the log-structured storage area according to an object reference stored in the hash entry. In addition, the server may determine whether there is the latest incremental update in the log-structured storage area by determining whether there is an incremental update reference for the latest incremental update in the hash entry.

Optionally, as another embodiment, the server may further read the current version of the object from the log-structured storage area, determine whether there is the latest incremental update in the log-structured storage area, return the current version of the object to a client if there is no latest incremental update in the log-structured storage area.

The server may read the latest incremental update from the log-structured storage area according to the incremental update reference if there is the incremental update reference for the latest incremental update in the hash entry. Then the server may merge the latest incremental update with the object to obtain the full latest version of the object, and return the full latest version of the object to the client.

According to embodiments of the present application, the object may be stored in the log-structured storage area through a hash table, and when reading the object from the log-structured storage area, the server may find a hash entry for the object in the hash table using a primary key for current version of the object, and reads the current version of the object from the log-structured storage area according to an object reference in the hash entry. The server determines whether there is an incremental update reference for the latest incremental update in the hash entry, and reads the latest incremental update from the log-structured storage area according to the incremental update reference if there is the incremental update reference for the latest incremental update in the hash entry.

According to embodiments of the present application, the hash table may provide fast access to the object and the incremental update in the log-structured storage area, and it allows the object to be located quickly according to the primary key. For example, the server may find the corresponding hash entry in the hash table according to the primary key and a hash function, and read the object or the precious incremental update according to the object reference or the incremental update reference stored in the hash entry for the object from the log-structured storage area respectively.

Figure 3:
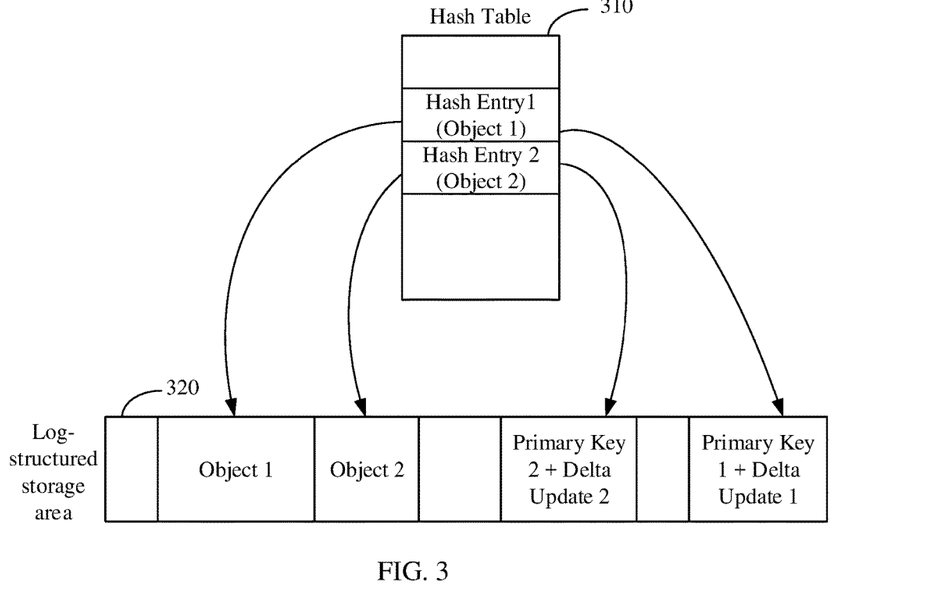
FIG. 3 depicts a schematic diagram of a hash table according to an embodiment of the present application.

FIG. 3 depicts a schematic diagram of a hash table 310 and a log-structured storage area 320 according to an embodiment of the present application.

Referring to FIG. 3, the hash table 310 includes multiple entries corresponding to different objects. The log-structured storage area 320 may be divided into multiple segments. For example, Hash Entry 1 corresponds to Object 1, and Hash Entry 2 corresponds to Object 2. Hash Entry 1 has an object reference to Object 1 which is stored in the log-structured storage area 320 and an update reference to Object 1 (designated as Primary Key 1+Delta Update 1) which is stored in the log-structured storage area 320, and Hash Entry 2 has an object reference to Object 2 which is stored in the log-structured storage area 320 and an update reference to Object 2 (designated as Primary Key 2+Delta Update 2) which is stored in the log-structured storage area 320.

Figure 4:
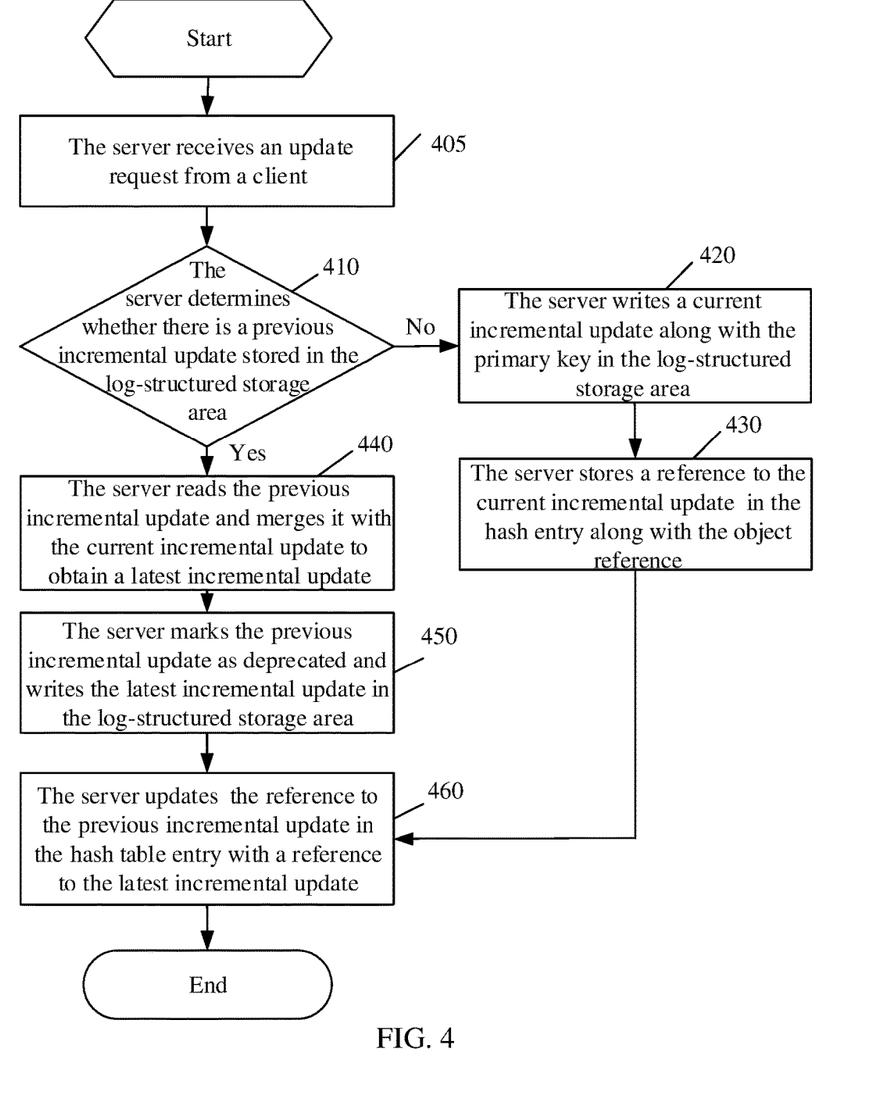
FIG. 4 depicts a schematic flowchart of a writing process in a log-structured storage method according to another embodiment of the present application.

FIG. 4 depicts a schematic flowchart of an update process in a log-structured storage method according to another embodiment of the present application. The embodiment of FIG. 4 is an example of an update process in the FIG. 2. The update process includes the following contents.

Step 405: The server receives an update request from a client. The update request may include a current incremental update of the object.

Before an object is updated for the first time, there might be an original version of object stored in the log-structured storage area and the server further writes a first incremental update of the object in the log-structured storage area. Subsequently, once the object is updated again, there might be a previous incremental update stored in the log-structured storage area. In addition, it is possible that there is no previous incremental update stored in the log-structured storage area if the previous incremental update has been merged with the object in a background cleaning process.

Step 410: The server determines whether there is a previous incremental update stored in the log-structured storage area.

If the object has an old incremental update, i.e., there is a previous incremental update stored in the log-structured storage area, perform step 440. If the object has no an old incremental update, i.e., there is not an incremental update of the object stored in the log-structured storage area, or the previous incremental update has been merged with the object in a background cleaning process, perform step 420.

Step 420: The server writes the current incremental update along with the primary key in the log-structured storage area.

Step 430: The server stores a reference to the current incremental update in the hash entry along with the object reference.

For example, the hash table and the corresponding hash entry are generated when the original version of the object is written in the log-structured storage area. For example, the hash entry for the object includes the primary key and the reference to the original version of the object. When a latest incremental update is written in the log-structured storage area along with the primary key, the reference to the latest incremental update is added to the hash entry for the original version of the object. If there is a reference to the previous incremental update in the hash entry, the reference to the previous incremental update will be updated to a reference to the latest incremental update.

Step 440: The server reads the previous incremental update and merges it with the current incremental update to obtain a latest incremental update.

For example, the server may read the previous incremental update from the log-structured storage area according to a reference to the previous incremental update, and apply the current incremental update to the previous incremental update to obtain the latest incremental update.

Step 450: The server marks the previous incremental update as deprecated and writes the latest incremental update in the log-structured storage area.

The latest incremental update is appended to the log-structured storage area. If the previous incremental update is marked as deprecated, it will be cleaned in the background cleaning process.

Step 460: The server updates the reference to the previous incremental update in the hash table entry with a reference to the latest incremental update.

For example, the reference to the previous incremental update in the hash table is replaced with the reference to the latest incremental update according to storage position of the latest incremental update in the log-structured storage area.

Figure 5:
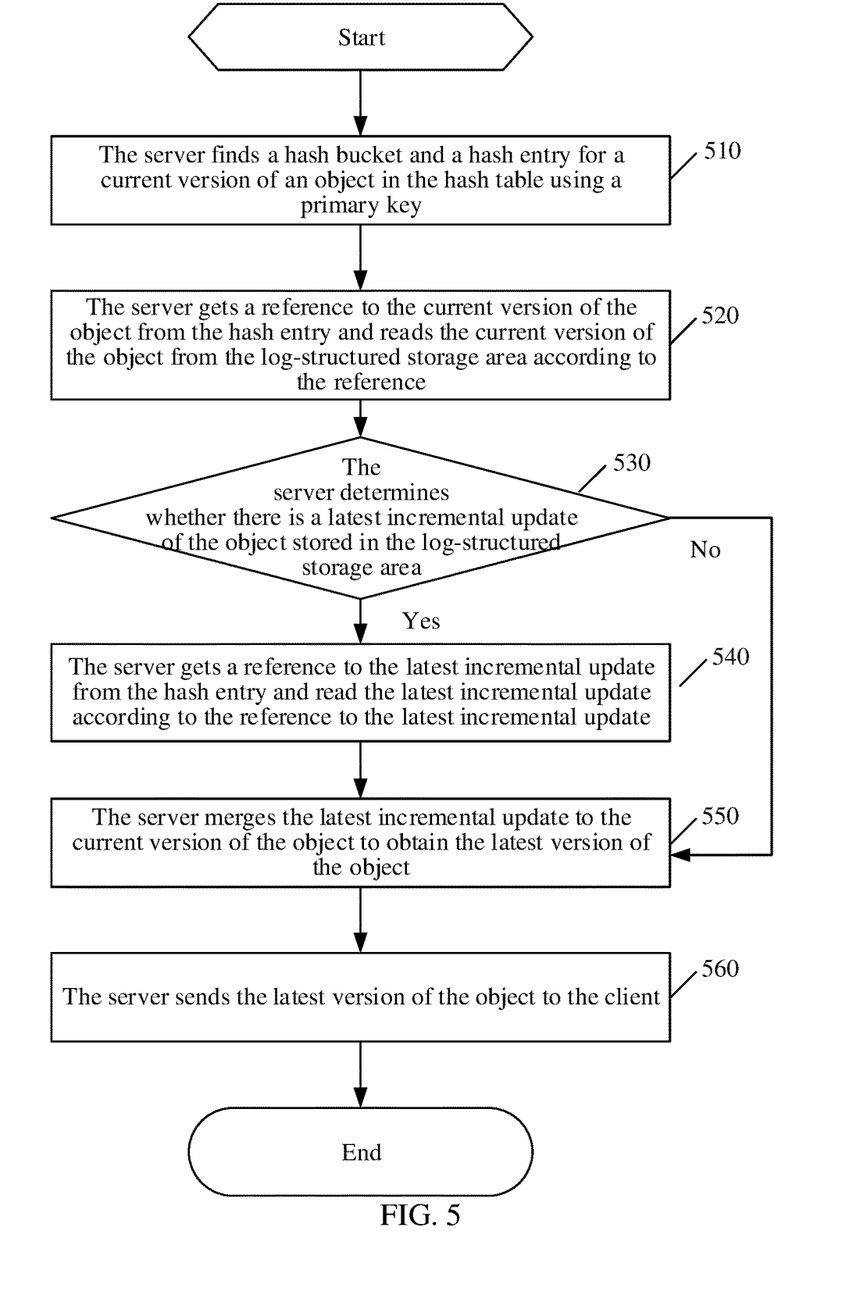
FIG. 5 depicts a schematic flowchart of a reading process in a log-structured storage method according to another embodiment of the present application.

FIG. 5 depicts a schematic flowchart of an update process in a log-structured storage method according to another embodiment of the present application. The embodiment of FIG. 5 is an example of a read process in the FIG. 2. The read process includes the following contents.

Step 510: The server finds a hash bucket and a hash entry for a current version of an object in the hash table using a primary key.

When the server receives a read request for the object from the client, the server first determines the hash bucket and the corresponding hash entry according to the primary key for the object and a hash function.

Step 520: The server gets a reference to the current version of the object from the hash entry and reads the current version of the object from the log-structured storage area according to the reference.

Step 530: The server determines whether there is a latest incremental update of the object stored in the log-structured storage area.

If there is a latest incremental update of the object, perform step 540. If there is not a latest incremental update of the object, perform step 550.

Step 540: The server gets a reference to the latest incremental update from the hash entry and read the latest incremental update according to the reference to the latest incremental update.

Step 550: The server merges the latest incremental update to the current version of the object to obtain the latest version of the object.

Step 560: The server sends the latest version of the object to the client.

If there is a latest incremental update of the object, the server sends the latest version of the object to the client. If there is not a latest incremental update of the object, the server sends the current version of the object as the latest version to the client directly.

Additionally, during a background cleaning process, the server may use a log cleaner to merge the incremental update with the full object during the background cleaning (garbage collection) process and, write a fresh object into the log and mark the old object as deprecated and update the hash table accordingly. This can prevent the merge process during the read operation.

Additionally, the server may further send the incremental update of the object to a replica node such that the object can be backed up in the replica node.

According to embodiments of the present application, very efficient memory utilization may be achieved as only incremental update is appended and the full object is kept as it is. Without reading the whole object, updates of the object are faster as the amount bytes written is less, and thus better cache efficient may be achieved. In addition, the amount of data transferred to a replica node will be very less as it is enough to transfer only the incremental update.

Figure 6:
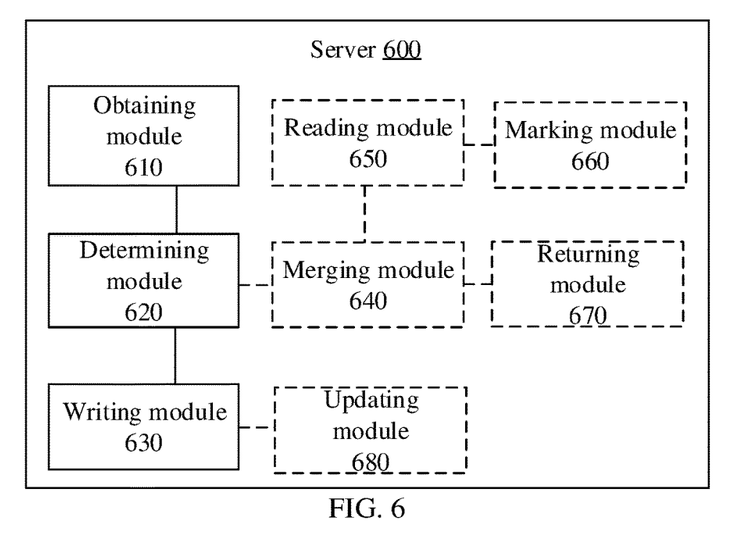
FIG. 6 is a simplified block diagram of a server according to an embodiment of the present application.

FIG. 6 is a simplified block diagram of a server 600 according to an embodiment of the present application. The server 600 includes an obtaining module 610, a determining module 620, and a writing module 630.

The obtaining module 610 is configured to obtain a current incremental update of an object when the object is updated, where a current version of the object is stored in a log-structured storage area of the server. The determining module 620 is configured to determine whether there is a previous incremental update of the object stored in the log-structured storage area. The writing module 630 is configured to write the current incremental update as a latest incremental update in the log-structured storage area if there is no previous incremental update of the object stored in the log-structured storage area.

Optionally, as another embodiment, the server 600 further includes a merging module 640.

The merging module 640 is configured to merge the previous incremental update with the current incremental update to obtain a latest incremental update if there is the previous incremental update of the object stored in the log-structured storage area, where the writing module 630 is further configured to write the latest incremental update in the log-structured storage area.

Optionally, as another embodiment, the server 600 further includes a reading module 650 and a marking module 660.

The reading module 650 is configured to read the previous incremental update from the log-structured storage area before the merging module 640 merges the previous incremental update with the current incremental update to obtain a latest incremental update. The marking module 660 is configured to mark the previous incremental update as deprecated after the writing module 630 writes the latest incremental update in the log-structured storage area.

According to embodiments of the present application, the current version of the object is stored in the log-structured storage area through a hash table in which a hash entry comprises an object reference for the current version of the object, the determining module 620 finds the hash entry in the hash table using a primary key for the current versions of the object, and determines whether there is an incremental update reference for the previous incremental update in the hash entry. The reading module 650 reads the previous incremental update from the log-structured storage area according to the incremental update reference if there is the incremental update reference for the previous incremental update in the hash entry.

Optionally, as another embodiment, the server 600 further includes an updating module 680 configured to update the incremental update reference for the latest incremental update in the hash entry after the latest incremental update is written in the log-structured storage area.

According to embodiments of the present application, the writing module 630 writes the latest incremental update along with the primary key in the log-structured storage area.

Optionally, as another embodiment, the merging module 640 is further configured to merge the current version of the object with the latest incremental update to obtain a latest version of the object during a background cleaning process, where the writing module 630 is further configured to write the latest version of the object in the log-structured storage area. The marking module 660 further marks the current version of the object as deprecated and the updating module 680 further updates the object reference for the latest version of the object to a new object reference for the latest version of the object in the hash entry.

Optionally, as another embodiment, the reading module 650 further reads the current version of the object from the log-structured storage area, where the determining module 620 is further configured to determine whether there is the latest incremental update in the log-structured storage area. The server 600 further includes a returning module 670 configured to return the current version of the object to a client if there is no latest incremental update in the log-structured storage area.

Optionally, as another embodiment, the reading module 650 is further configured to read the latest incremental update from the log-structured storage area if there is the latest incremental update in the log-structured storage area, the merging module 640 is further configured to merge the latest incremental update to the latest version of the object, and the returning module 670 is further configured to the latest version of the object to a client.

According to embodiments of the present application, the current version of the object is stored in the log-structured storage area through a hash table, and the reading module 650 finds a hash entry for the object in the hash table using a primary key for current version of the object, and reads the current version of the object from the log-structured storage area according to an object reference in the hash entry, the determining module 620 determines whether there is an incremental update reference for the latest incremental update in the hash entry, and the reading module 650 reads the latest incremental update from the log-structured storage area according to the incremental update reference if there is the incremental update reference for the latest incremental update in the hash entry.

The server 600 may perform each process of the method as shown in FIG. 2, and thus will not be described redundantly herein.

Figure 7:
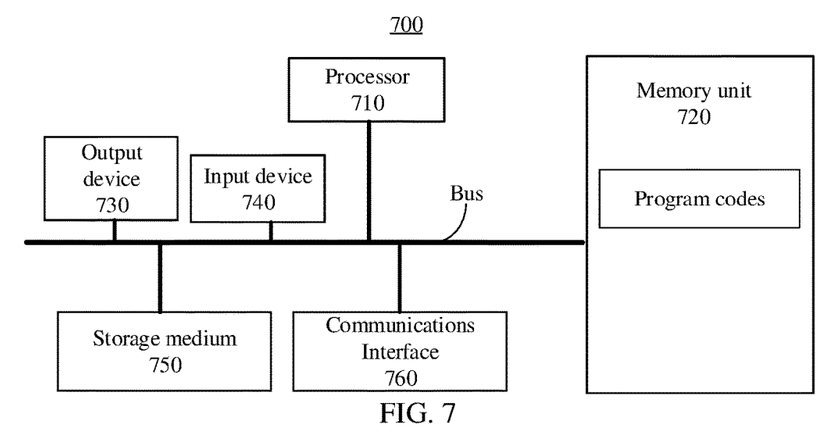
FIG. 7 is a simplified block diagram of the server according to another embodiment of the present application.

FIG. 7 is a simplified block diagram of the server 700 according to another embodiment of the present application. The server includes a processor 710, which is coupled with one or more data storage means. The data storage means may include a storage medium 750 and a memory unit 720. The storage medium 750 may be read-only, like a read-only memory (ROM), or readable/writeable, like a hard disk or a flash memory. The memory unit 720 may be a random access memory (RAM). The memory unit 720 may be either physically integrated with or within the processor 710 or constructed in a stand-alone unit or units.

The processor 710 provides sequencing and processing facilities for executing instructions, performing interruption actions, providing timing functions and may other functions. Optionally, the processor 710 includes one or multiple central processing units (CPUs). Optionally, the server 700 includes more than one processor 710. The term "processor" refers to one or more devices, circuits and/or processing cores configured to process data, such as computer program instructions.

Program codes to be executed by the processor 710 may be stored in the memory unit 720 or storage medium 750. Optionally, program codes stored in the storage medium 750 may be copied into the memory unit 720 for the processor 710 to execute.

The server 700 further includes a communications interface 760 for communication with another device or system directly or via an external network. Optionally, the server 700 further includes an output device 730 and an input device 740. The output device 730 is coupled with the processor 710, and capable of displaying information in one or more ways. The input device 740 is also coupled with the processor 710, capable of receiving an input from a user of the server 700 in one or more ways.

The above elements of the server 700 may be coupled with each other by a bus.

The server 700 can be a general-purpose computing device or an application-specific computing device. However, the present application is certainly not limited by any particular types of the computing device.

In an embodiment, the server 700 includes a memory unit 720 storing computer executable program codes, a communications interface 760, and a processor 710 coupled with the memory unit 720 and the communications interface 760, wherein the program codes includes instructions which, when executed by processor 710, cause the processor 710 to obtain a current incremental update of an object when the object is updated, where a current version of the object is stored in a log-structured storage area of the server 700, determine whether there is a previous incremental update of the object stored in the log-structured storage area, write the current incremental update as a latest incremental update in the log-structured storage area if there is no previous incremental update of the object stored in the log-structured storage area.

Optionally, as another embodiment, the processor 710 further merges the previous incremental update with the current incremental update to obtain a latest incremental update if there is the previous incremental update of the object stored in the log-structured storage area, and writes the latest incremental update in the log-structured storage area.

Optionally, as another embodiment, the processor 710 further reads the previous incremental update from the log-structured storage area before merging the previous incremental update with the current incremental update to obtain a latest incremental update, and marks the previous incremental update as deprecated after writing the latest incremental update in the log-structured storage area.

According to embodiments of the present application, the current version of the object is stored in the log-structured storage area through a hash table in which a hash entry comprises an object reference for the current version of the object, the processor 710 finds the hash entry in the hash table using a primary key for the current versions of the object, determines whether there is an incremental update reference for the previous incremental update in the hash entry, and reads the previous incremental update from the log-structured storage area according to the incremental update reference if there is the incremental update reference for the previous incremental update in the hash entry.

Optionally, as another embodiment, the processor 710 further updates the incremental update reference for the latest incremental update in the hash entry after the latest incremental update is written in the log-structured storage area.

According to embodiments of the present application, the processor 710 writes the latest incremental update along with the primary key in the log-structured storage area.

Optionally, as another embodiment, the processor 710 further merges the current version of the object with the latest incremental update to obtain a latest version of the object during a background cleaning process, writes the latest version of the object in the log-structured storage area, marks the current version of the object as deprecated and updates the object reference for the latest version of the object to a new object reference for the latest version of the object in the hash entry.

Optionally, as another embodiment, the processor 710 further reads the current version of the object from the log-structured storage area, determines whether there is the latest incremental update in the log-structured storage area, and returns the current version of the object to a client if there is no latest incremental update in the log-structured storage area.

Optionally, as another embodiment, the processor 710 further reads the latest incremental update from the log-structured storage area if there is the latest incremental update in the log-structured storage area, merges the latest incremental update to the latest version of the object, and sends the latest version of the object to a client.

According to embodiments of the present application, the current version of the object is stored in the log-structured storage area through a hash table, and the processor 710 finds a hash entry for the object in the hash table using a primary key for current version of the object, reads the current version of the object from the log-structured storage area according to an object reference in the hash entry, determines whether there is an incremental update reference for the latest incremental update in the hash entry, and reads the latest incremental update from the log-structured storage area according to the incremental update reference if there is the incremental update reference for the latest incremental update in the hash entry.

The server 700 may perform each process of the method as shown in FIG. 2, and thus will not be described redundantly herein.

The persons of ordinary skills in the art may realize that the units and steps of algorithm of the respective examples, described with reference to the embodiments disclosed in the text, can be accomplished by electronic hardware, or a combination of computer software and electronic hardware. Whether these functions are executed by means of hardware or software depends on a specific application and a design constraint condition of the technical solutions. Professional technical personnel may accomplish the described functions by adopting a different method for each specific application, but this kind of accomplishment shall not go beyond the scope of the present application.

Those skilled in the art may understand clearly that, for convenience and simplicity of description, specific working processes of the above-described systems, apparatus and units may be referred to corresponding processes in the aforementioned embodiments of the methods, and will not be described repeatedly herein.

In several embodiments provided by the present application, it shall be understood that disclosed systems, apparatus and methods may be implemented by other manners. For example, the embodiments of the apparatus described above are just illustrative. For example, division of the units is just a kind of division according to logical functions, and there may be other division manners for practical implementations. For example, a plurality of units or components may be combined or integrated into another system, or some features may be neglected or may not be performed. In addition, the shown or discussed mutual coupling or direct coupling or communication link may be an indirect coupling or communication link through some interfaces, apparatus or units, which may be in an electrical form, a mechanical form or in other forms.

The units described as separated parts may be, or may not be, physically separated, and the parts shown as units may be, or may not be, physical units, which may be located in one place or distributed to a plurality of network elements. Part or all units therein may be selected, according to an actual need, to implement the objective of solutions provided in the present application.

In addition, the respective functional units in the respective embodiments of the present application may be integrated into one processing unit, or the respective units may exist separately and physically, or, two or more units may be integrated into one unit.

If the function is implemented in the form of a software functional unit and is sold or used as an independent product, the function may be stored in a computer readable storage medium. Based on this understanding, the spirit, or the parts that make contributions to the other approaches, of the technical solution in the present application may be embodied in the form of a software product. The computer software product is stored in a storage medium, and includes a number of instructions that enable a computer device (may be a personal computer, a server, or a network device) to execute all or part of steps of the method described in the respective embodiments of the present application. The preceding storage mediums includes various mediums that can store program codes, such as, a U disk, a removable hard disk, a ROM, a RAM, a magnetic disk, an optical disk, or the like.

The foregoing descriptions are merely specific embodiments of the application, rather than limiting the protection scope of the application. It is easy for any one skilled in the art to conceive changes or substitutions within the technical scope disclosed by the application, and the changes or substitutions shall fall in the protection scope of the application. Therefore, the protection scope of the present application shall be defined by the claims.

What is claimed is:

1. A log-structured storage method, comprising:
   obtaining a current incremental update of an object when the object is updated, wherein a current version of the object is stored in a log-structured storage area of a server through a hash table in which a hash entry comprises an object reference for the current version of the object;
   finding the hash entry in the hash table using a primary key for the current versions of the object;
   determining whether there is an incremental update reference for the previous incremental update in the hash entry;
   when there is no incremental update reference for the previous incremental update in the hash entry, writing the current incremental update as a latest incremental update in the log-structured storage area; and
   when there is the incremental update reference for the previous incremental update in the hash entry, reading the previous incremental update from the log-structured storage area, merging the previous incremental update with the current incremental update to obtain the latest incremental update, writing the latest incremental update in the log-structured storage area, and marking the previous incremental update as deprecated.

2. The log-structured storage method according to claim 1, further comprising updating an incremental update reference for the latest incremental update in the hash entry after the latest incremental update is written in the log-structured storage area.

3. The log-structured storage method according to claim 1, wherein writing the latest incremental update in the log-structured storage area comprises writing the latest incremental update along with the primary key in the log-structured storage area.

4. The log-structured storage method according to claim 3, further comprising:
   merging the current version of the object with the latest incremental update to obtain a latest version of the object during a background cleaning process;
   writing the latest version of the object in the log-structured storage area;
   marking the current version of the object as deprecated; and
   updating an object reference for the latest version of the object to a new object reference for the latest version of the object in the hash entry.

5. A server, comprising:
   a memory comprising instructions; and a processor coupled to the memory and configured to execute the instructions, wherein the instructions cause the processor to be configured to:
obtain a current incremental update of an object when the object is updated, wherein a current version of the object is stored in a log-structured storage area of the server through a hash table in which a hash entry comprises an object reference for the current version of the object;
find the hash entry in the hash table using a primary key for the current versions of the object;
determine whether there is an incremental update reference for the previous incremental update in the hash entry;
when there is no incremental update reference for the previous incremental update in the hash entry, write the current incremental update as a latest incremental update in the log-structured storage area; and
when there is the incremental update reference for the previous incremental update in the hash entry, read the previous incremental update from the log-structured storage area, merge the previous incremental update with the current incremental update to obtain the latest incremental update, write the latest incremental update in the log-structured storage area, and mark the previous incremental update as deprecated.

6. The server according to claim 5, wherein the instructions further cause the processor to be configured to update an incremental update reference for the latest incremental update in the hash entry after the latest incremental update is written in the log-structured storage area.

7. The server according to claim 5, wherein the instructions further cause the processor to be configured to write the latest incremental update along with the primary key in the log-structured storage area.

8. The server according to claim 7, wherein the instructions further cause the processor to be configured to:
merge the current version of the object with the latest incremental update to obtain a latest version of the object during a background cleaning process;
write the latest version of the object in the log-structured storage area;
mark the current version of the object as deprecated; and
update an object reference for the latest version of the object to a new object reference for the latest version of the object in the hash entry.

9. A log-structured storage method, comprising:
obtaining a current incremental update of an object when the object is updated, wherein a current version of the object is stored in a log-structured storage area of a server through a hash table;
determining whether there is a previous incremental update of the object stored in the log-structured storage area;
writing the current incremental update as a latest incremental update in the log-structured storage area when there is no previous incremental update of the object stored in the log-structured storage area;
finding a hash entry for the object in the hash table using a primary key for current version of the object;
reading the current version of the object from the log-structured storage area according to an object reference in the hash entry;
determining whether there is an incremental update reference for the latest incremental update in the hash entry;
when there is no incremental update reference for the latest incremental update in the hash entry, returning the current version of the object to a client; and
when there is the incremental update reference for the latest incremental update in the hash entry, reading the latest incremental update from the log-structured storage area according to the incremental update reference, merging the latest incremental update to a latest version of the object, and returning the latest version of the object to the client.

10. A server, comprising:
a memory comprising instructions; and
a processor coupled to the memory and configured to execute the instructions, wherein the instructions cause the processor to be configured to:
obtain a current incremental update of an object when the object is updated,
wherein a current version of the object is stored in a log-structured storage area of a server through a hash table;
determine whether there is a previous incremental update of the object stored in the log-structured storage area;
write the current incremental update as a latest incremental update in the log-structured storage area when there is no previous incremental update of the object stored in the log-structured storage area;
find a hash entry for the object in the hash table using a primary key for current version of the object;
read the current version of the object from the log-structured storage area according to an object reference in the hash entry;
determine whether there is an incremental update reference for the latest incremental update in the hash entry;
when there is no incremental update reference for the latest incremental update in the hash entry, return the current version of the object to a client; and
when there is the incremental update reference for the latest incremental update in the hash entry, read the latest incremental update from the log-structured storage area according to the incremental update reference, merge the latest incremental update to a latest version of the object, and return the latest version of the object to the client.

* * * * *